2,784,077
PROCESSES OF SMELTING FINELY DIVIDED METALLIC ORE

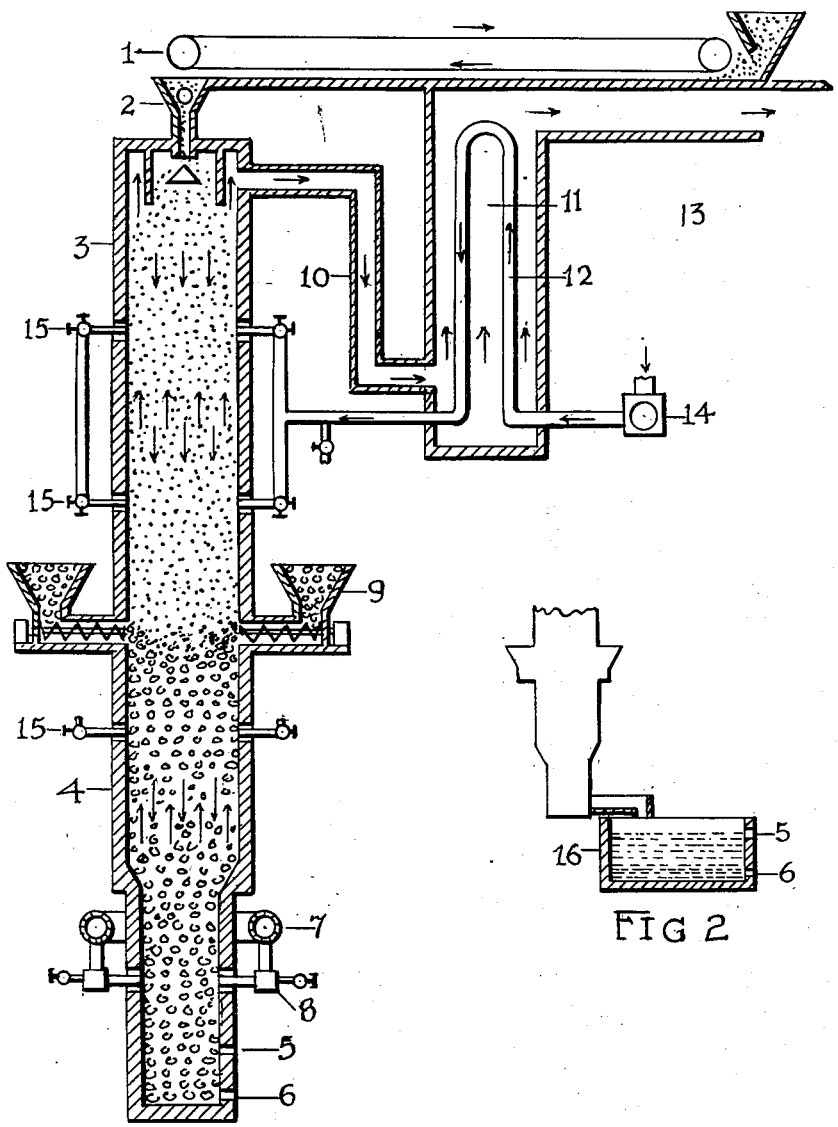

William E. Greenawalt, Denver, Colo.

Application April 21, 1955, Serial No. 502,969

8 Claims. (Cl. 75—26)

My invention relates to smelting finely divided metallic ores; principally to iron and copper ores such as concentrate obtained from milling ores too low grade to be profitably smelted direct. It will be described principally in reference to iron ores.

The iron ore concentrate, usually obtained by gravity, magnetic separation, or flotation, of finely ground ore, is ordinarily prepared for blast furnace smelting by sintering, which converts it into semi-fluid lumps. This is done by mixing the finely ground ore concentrate with about ten percent water and several percent coke, igniting the charge and passing a blast of air through the porous mixture. The ore, in sintering, is heated to about 2100 deg. F., after which it is cooled, and when the cold ore is charged into the blast furnace it has to be reheated through the sintering temperature of 2100 deg. F. to the smelting temperature of 2800 to 3000 deg. F. The principal object of my invention is to smelt the finely ground concentrate direct, without sintering.

Much of the iron ore now smelted in the United States is being imported from various parts of the world; and increasingly as the domestic high grade ore reserves are dwindling.

If the finely divided ore, such as gravity, magnetic, or flotation concentrate could be smelted as cheap or cheaper than smelting lumps, the exploitation of the enormous deposits of the low grade domestic ores might favorably compete with foreign imports.

Referring to the drawings: Fig. 1 represents a flow diagram of the process in vertical longitudinal section. Fig. 2 shows, in outline, the addition of a forehearth to the smelting furnace for certain purposes.

In operating the process; the ore is dried or heated in the drier 1 and delivered into the hopper 2 from which it is fed in a continuous stream into the highly heated atmosphere of a melting furnace 3 to melt it, and drops as a shower into the upper part of the smelting furnace 4, which is filled with highly heated carbon, usually coke. The melting furnace and the smelting furnace are combined in a vertical shaft, in which the lower part of the melting furnace coincides with the upper part of the smelting furnace, and so arranged that the ore showered downwardly in a continuous stream through the melting furnace 3 will be delivered into the upper part of the smelting furnace 4 in showered form, into a column of highly heated coke, and trickles downwardly through the coke into the smelting furnace hearth to complete the reduction of the iron oxide to metallic or pig iron. The mixture of molten iron and slag accumulates in the smelting furnace hearth in the lower part of the smelting furnace, where they are separated. The slag flows out through the slag hole 5, and the iron flows out through the tap hole 6. Air is delivered into the lower part of the smelting furnace through the bustle pipe 7 and the tuyeres 8. Coke is injected between the upper part of the smelting furnace and the lower part of the melting furnace in a regulated stream through the coke feeding mechanism 9. The smelting furnace gas passing upwardly through the highly heated column of coke, exhausted at a temperature of about 2300 deg. F. or over, consisting principally of CO, CO₂, and nitrogen, flows into the bottom of the melting furnace and upwardly through the showered ore. The mixture of melting and smelting furnace gas is withdrawn from the melting furnace through the duct 10 and flows into the heat exchanger 11, and then into the drier 1 or dust chamber 13 to dry or heat fresh ore. Fresh air is forced into the heat exchanger 11 through the pipe 12 by means of the blower 14, and may be used anywhere in the process, principally as hot air in the melting and smelting furnaces.

As applied to smelting finely divided iron ore, such as gravity, magnetic, or flotation concentrates obtained from milling: The ore is fed into the drier 1 where it is dried or heated and delivered into the hopper 2, from which it is showered through the highly heated atmosphere of the melting furnace 3 to melt it. The molten ore, separated from the melting furnace gas, is delivered, as a shower, into the upper part of the blast smelting furnace 4, and descends in more or less uniformly scattered form, through the column of highly heated coke into the smelting furnace hearth, where the molten iron is separated from the molten slag.

The smelting furnace coke is crushed to a size to permit the free flow of gas through it and make intimate contact between the highly heated coke and the molten ore. Its temperature is maintained at the point of highest efficiency, or about 2800–3000 deg. F. at the tuyere level, much the same as in ordinary blast furnace smelting, except that the upper part of the column of coke is maintained at or above the melting temperature of the molten ore from the melting furnace showered into it.

The rate of reduction of the iron oxide in the smelting furnace is much faster in fluid than in solid form, because fresh surfaces are continuously and rapidly exposed at all times to the full action of the highly heated coke and carbon monoxide, as the molten ore percolates in thin streams downwardly against a continuously ascending current of highly heated reducing gas, to produce pig iron and slag, and both the molten iron ore and the molten slag are in close contact with the more or less quiescent highly heated coke in the smelting furnace hearth.

The reactions may be summarized:

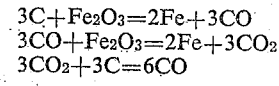

$$3C + Fe_2O_3 = 2Fe + 3CO$$
$$3CO + Fe_2O_3 = 2Fe + 3CO_2$$
$$3CO_2 + 3C = 6CO$$

These chemical reactions do not require atmospheric air, but they absorb heat, and the heat has to be supplied to produce the reactions and prevent the molten ore from freezing.

Air, consisting of 21 parts of oxygen and 79 parts of nitrogen, is not necessary for the reducing operations in the blast furnace. The nitrogen is neutral and a nuisance; the oxygen is used to burn the coke to provide the necessary heat for the high temperature reactions. Carbon and heat are the essentials. If the mixture of molten ore and slag is introduced into the top of the coke column in the smelting furnace 4 at a temperature of about 2300 deg. F. the only air required to react with the coke or carbon would be that necessary to raise the temperature of the molten charge from about 2300 deg. F. to 2800–3000 deg. F. at the tuyere level of the smelting furnace. The coke at the top of the smelting furnace would be maintained above the melting point of the molten ore, or about 2300 deg. F. That would also be about the temperature of the gas issuing from the hot coke column at the top of the smelting furnace 4. This gas, consisting principally of CO, CO₂, and nitrogen, passes directly from the smelting furnace 4 into the showered stream of ore in the melting furnace 3, where the temperature may be raised to any extent desired to melt the ore, by injecting fluid fuel, such as powdered coal, natural gas, or fuel oil into the melting furnace, through the injectors 15, and regulating the air to burn it as desired. The melting furnace atmosphere may be oxidizing, or non-reducing to iron oxide. The main object is to melt the ore, but if the lower part of the melting furnace is reducing, it would save a corresponding amount of coke consumed in the smelting furnace.

In ordinary iron blast furnace smelting it requires seven times as much coke to form and melt a pound of slag as is necessary to reduce and melt a pound of iron from iron oxide. Somewhat less than one-third of a pound of coke is technically sufficient to reduce and melt a pound of iron from iron oxide; about one pound is usually required in practice.

In my process the charge of ore and flux is efficiently melted with any cheap fuel, such as powdered coal, natural gas, or fuel oil, injected with air through the injectors 15, and the molten mixture is showered from the melting furnace into the smelting furnace at a temperature of about 2300 deg. F. This makes an enormous saving in coke possible. And if the temperature in the lower part of the melting furnace is reducing by injecting a small amount of powdered coal or other reducing agent into the exhaust gas of the smelting furnace, some of the finest of the finely divided ore may be reduced and partly converted into the suboxide or elemental metal in the melting furnace.

The coke, greatly reduced in volume compared with ordinary iron blast furnace smelting, is fed into the vertical shaft intermediate the melting furnace 3 and the smelting furnace 4 in a slow regulated continuous stream through the coke injectors 9. This avoids a chilling effect of the coke on the molten ore.

The melting furnace should be high enough to melt even the coarser particles of the finely divided ore concentrate. This would permit of coarser and cheaper grinding to make an acceptable concentrate, without going to the extreme fineness required for flotation or magnetic separation. The waste gas issuing from the melting furnace would have about the same temperature as that issuing from reverberatory or open hearth furnaces, or about 2200–2300 deg. F., or high enough to prevent accumulation of semi-fused ore in the melting furnace. The temperature of the melting furnace should be as high as practical at its lower end and as low as practical at its upper end.

Since there is no stationary ore charge in the melting furnace, there is no ore weight to be supported in its construction. The walls of the melting furnace are simple, and can be built of suitable refractories and cooled with water jacketed sides. This permits of maintaining a high temperature in the lower part of the melting furnace without undue corrosion of the furnace walls. The extra height is compensated for in the light weight and simplicity of the furnace construction. Iron ore blast furnaces are usually from 75 to 100 feet high, and the vertical shaft, including the melting furnace and the smelting furnace, may economically be much higher than that.

Similarly, in the smelting furnace charged with coke. The molten ore from the melting furnace flows through the coke without much resistance, and the coke has only about a tenth of the weight of iron oxide ores, and only about a fifth of the weight of limestone or quartz, which are the principal constituents of the slag.

The height of the smelting furnace in the lower part of the vertical shaft is determined by several factors. It need not be very high as compared with ordinary iron ore blast furnaces, because the ore, instead of being charged cold at atmospheric temperature of 65 deg. F., is charged molten at about 2300 deg. F., and the amount of air injected into the smelting furnace at the tuyeres or elsewhere is relatively small. In regular blast furnace smelting the air is usually preheated to about 1000 deg. F., which in the blast furnace is raised to 2800–3000 deg. F. The volume of air introduced into the smelting furnace charge in my process is small as compared with that of smelting the entire charge from the atmospheric temperature of about 65 deg. F. to 2800–3000 deg. F. Similarly, the amount of and weight of the coke in the smelting furnace is correspondingly less, and the construction cost will be greatly reduced.

The process applied to finely divided copper ore, such as gravity of flotation concentrate, is much the same as applied to iron ore, but with several important variations or differences. Iron ore is usually in the form of oxide, and the end product of smelting is usually metallic or pig iron. Copper concentrate is usually in the form of sulphide, and the smelted end product is usually in the form of matte—copper-iron sulphide—with the gangue eliminated as slag. Iron ore smelting is largely in the nature of a reducing process to get rid of the oxygen. Copper smelting is in the nature of an oxidizing process to get rid of the sulphur. The finely divided ore or concentrate, usually in the form of copper-iron sulphide, is showered through the highly heated atmosphere of the melting furnace 3 to oxidize the sulphur and melt the ore. The amount of oxidation determines the quality of matte desired for converting into blister copper; and the oxidation is determined by regulating the amount of air or oxygen introduced into the melting furnace through the tuyeres 8 and the air injectors 15, with or without fluid fuel, such as powdered coal, fuel oil, or natural gas. The oxygen of the air in the highly heated atmosphere of the melting furnace 3 combines with the sulphur of the sulphides, and is eliminated as sulphur dioxide. There will usually be enough heat generated in this reaction to bring the ore to the melting temperature in the melting furnace, or very close to it. Very little carbonaceous fuel is required to raise the temperature of the molten ore in the melting furnace to the temperature necessary for efficient operation. The mixture of molten ore and slag is then delivered from the lower part of the melting furnace 3 as a shower of subdivided streams into the upper part of the highly heated coke in the smelting furnace 4 where its temperature is increased to efficiently complete the reactions to produce the grade of matte desired, or even the crude metal if the oxidation and elimination of the sulphur is practically complete. It will usually be desirable to produce a very high grade matte, closely approaching the pure copper sulphide, $Cu_2S$. This can easily be done and will make a perceptible saving in converting the matte into blister copper in the usual converter process. The smelting furnace gas, consisting principally of CO, $CO_2$, nitrogen, and a small amount of $SO_2$, at a temperature of about 2300 deg. F., or safely above the melting point of the ore, flows into the melting furnace, where its temperature is increased, and flows through the showered ore in the melting furnace, and out of the melting furnace into the heat exchanger and dust chamber or drier.

The metal recovery from the mixture of molten matte and slag depends somewhat on the temperature of the mixture, and a high temperature is best obtained at minimum expense by passing the mixture of molten matte and slag from the melting furnace 3 through the highly heated column of coke, or other reacting agents such as quartz, or a mixture of them, into the smelting furnace 4. The amount of coke consumed in the smelting furnace is relatively small, because the sulphur in the matte, oxidized in the smelting furnace, would provide some heat.

It will usually be desirable to flow the molten mixture of matte and slag from the smelting furnace 4 into a forehearth, separated from the smelting furnace, as shown in 16, Fig. 2. This is particularly desirable in large scale copper or iron ore smelting, when the molten product of several smelting furnace units flows into a common forehearth in a continuous stream, and the slag flows out of the forehearth in a continuous stream at the top. The molten metal product may be tapped as desired. This large volume of relatively quiescent mixture will result in a high metal recovery and a clean slag.

I claim:

1. A process of smelting finely divided iron oxide ore comprising, showering the ore through the highly heated oxidizing atmosphere of a melting furnace to melt it, delivering the molten oxide ore in showered form from the lower part of the melting furnace into the upper part of a smelting furnace, passing the molten oxide ore, separated from the melting furnace gas, through a highly heated column of carbon in permeable lump form in a smelting furnace to reduce the iron oxide ore into a mixture of molten metallic iron and slag, and separating the molten iron from the molten slag.

2. A process of smelting finely divided iron oxide ore comprising, showering the ore through the highly heated non-reducing atmosphere of a melting furnace to melt it, delivering the molten oxide ore in showered form from the lower part of the melting furnace into the upper part of a smelting furnace, passing the unreduced molten ore, separated from the melting furnace gas, through a highly heated column of carbon in permeable lump form in the smelting furnace to convert the iron oxide ore into a mixture of molten metallic iron and slag, injecting air into the column of carbon to produce the heat necessary to convert the iron oxide ore into a mixture of metallic iron and slag, and separating the molten iron from the molten slag.

3. A process of smelting finely divided metallic ore comprising, showering the ore through the highly heated non-reducing atmosphere of a melting furnace in the upper part of a vertical shaft to melt it, delivering the unreduced molten ore in showered form from the lower part of the melting furnace into the upper part of a smelting furnace in the lower part of the vertical shaft, passing the molten ore, separated from the melting furnace gas, through a highly heated column of carbon in permeable lump form in the smelting furnace to convert the ore into a mixture of molten metallic product and molten slag, and separating the molten metallic product from the molten slag.

4. A process of smelting finely divided metallic ore comprising, showering the ore through the highly heated non-reducing atmosphere of a melting furnace to melt it, delivering the molten oxide ore in showered form from the lower part of the melting furnace into the upper part of a smelting furnace in the lower part of the vertical shaft, passing the molten ore, separated from the melting furnace gas through a highly heated column of carbon in permeable lump form in the smelting furnace to convert the ore into a mixture of molten metallic product and molten slag, separating the molten metallic product from the molten slag, and injecting air into the column of carbon in the smelting furnace to maintain the furnace at the smelting temperature.

5. A process of smelting finely divided metallic ore comprising, showering the ore through the highly heated oxidizing atmosphere of a melting furnace in the upper part of a vertical shaft to melt it, delivering the molten oxide ore in showered form from the lower part of the melting furnace into a smelting furnace in the lower part of the vertical shaft, passing the molten ore, separated from the melting furnace gas, through a highly heated column of carbon in permeable lump form in the smelting furnace to convert the ore into a mixture of molten metallic product and molten slag, injecting air into the column of carbon in the smelting furnace, and passing the hot waste gas from the smelting furnace into and through the showered ore in the melting furnace.

6. A process of smelting finely divided iron oxide ore comprising, showering the ore through the highly heated non-reducing atmosphere of a melting furnace in the upper part of a vertical shaft to melt it, delivering the molten iron oxide ore in showered form from the melting furnace into a smelting furnace in the lower part of the vertical shaft, passing the molten oxide ore separated from the melting furnace gas through a highly heated column of carbon in permeable lump form in the smelting furnace to reduce the molten iron oxide ore into a mixture of molten metallic iron and slag, and separating the molten metallic iron from the molten slag.

7. A process of smelting finely divided iron oxide ore comprising, showering the ore through the highly heated non-reducing atmosphere of a melting furnace in the upper part of a vertical shaft to melt it, delivering the molten unreduced ore in showered form from the melting furnace into a highly heated column of carbon in permeable lump form in a smelting furnace in the lower part of the vertical shaft to reduce the molten iron oxide ore into a mixture of molten metallic iron and molten slag, delivering the carbon into the vertical shaft intermediate the melting furnace and the smelting furnace, and separating the molten metallic iron from the molten slag.

8. A process of smelting finely divided iron oxide ore comprising, showering the ore through the highly heated non-reducing atmosphere of a melting furnace in the upper part of a vertical shaft to melt it, delivering the unreduced molten ore in showered form from the melting furnace into a highly heated column of carbon in permeable lump form in a smelting furnace in the lower part of the vertical shaft to reduce the molten iron oxide ore into a mixture of molten metallic iron and slag, injecting air into the column of carbon in the smelting furnace to heat it, passing the hot smelting furnace gas containing carbon monoxide into the highly heated oxidizing atmosphere in the melting furnace, and separating the molten metallic iron from the molten slag.

References Cited in the file of this patent

UNITED STATES PATENTS

| | | |
|---|---|---|
| 57,969 | Reese | Sept. 11, 1866 |
| 156,243 | Wheeler | Oct. 27, 1874 |
| 538,004 | Williamson | Apr. 23, 1895 |
| 1,775,713 | Baily | Sept. 16, 1930 |
| 2,321,310 | Moore | June 8, 1943 |
| 2,581,597 | Nissim | Jan. 8, 1952 |

FOREIGN PATENTS

| | | |
|---|---|---|
| 9,346 | Great Britain | June 21, 1901 |